US012560269B2

(12) United States Patent
Talke

(10) Patent No.: US 12,560,269 B2
(45) Date of Patent: Feb. 24, 2026

(54) 360-DEGREE SENSOR BODY FOR IN-PIPE ROBOT SYSTEM

(71) Applicant: United States of America as represented by the Secretary of the Navy, San Diego, CA (US)

(72) Inventor: Kurt Arthur Talke, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 232 days.

(21) Appl. No.: 18/520,957

(22) Filed: Nov. 28, 2023

(65) Prior Publication Data

US 2025/0172230 A1 May 29, 2025

(51) Int. Cl.
| | |
|---|---|
| *F16L 55/32* | (2006.01) |
| *F16L 55/40* | (2006.01) |
| *H04N 23/54* | (2023.01) |
| *H04N 23/90* | (2023.01) |
| *F16L 101/30* | (2006.01) |

(52) U.S. Cl.
CPC .............. *F16L 55/32* (2013.01); *F16L 55/40* (2013.01); *H04N 23/54* (2023.01); *H04N 23/90* (2023.01); *F16L 2101/30* (2013.01)

(58) Field of Classification Search
CPC ....... F16L 55/32; F16L 55/40; F16L 2101/30; H04N 23/54; H04N 23/90
USPC .......................................................... 348/84
See application file for complete search history.

(56) References Cited

U.S. PATENT DOCUMENTS

| | | | | |
|---|---|---|---|---|
| 5,081,800 A | * | 1/1992 | Ruholl | .................... B24C 3/325 |
| | | | | 451/92 |
| 7,337,862 B1 | * | 3/2008 | Greenley | ............... A63H 17/25 |
| | | | | 180/21 |
| 7,343,863 B2 | | 3/2008 | Louis | |
| 7,581,611 B1 | * | 9/2009 | Kratz | ..................... A63H 17/21 |
| | | | | 180/224 |
| 8,205,559 B2 | | 6/2012 | Louis | |
| 8,210,289 B1 | | 7/2012 | Lu et al. | |
| 8,316,970 B1 | | 11/2012 | Tran | |
| 8,442,661 B1 | * | 5/2013 | Blackwell | ................ B25J 5/007 |
| | | | | 700/62 |
| 8,464,642 B2 | | 6/2013 | Louis | |

(Continued)

*Primary Examiner* — Matthew David Kim
(74) *Attorney, Agent, or Firm* — Naval Information Warfare Center, Pacific; Kyle Eppele

(57) ABSTRACT

A pipe-crawling robot comprising: a 360-degree sensor array mounted to a center body; first and second gimbal cradles rotatably connected to opposite sides of the center body; first and second wheel motors pivotally connected respectively to the first and second gimbal cradles, wherein the first and second wheel motors are respectively connected to first and second wheels; and a controller mounted within the center body and communicatively connected to the 360-degree sensor array, wherein the controller is configured to control rotation of the first and second gimbal cradles, amount of pivot of the first and second wheel motors, and motor speed and direction of rotation of the first and second wheel motors such that the pipe-crawling robot is capable of center-body-orientation-agnostic sensing and navigation while crawling through a pipe with only the first and second wheels in contact with an inner wall of the pipe.

19 Claims, 7 Drawing Sheets

(56)                    References Cited

U.S. PATENT DOCUMENTS

| | | | |
|---|---|---|---|
| 8,788,130 B1 | 7/2014 | Tran et al. | |
| 9,531,951 B2 | 12/2016 | Pfeil | |
| 11,307,063 B2 * | 4/2022 | Low | G01B 11/24 |
| 2002/0137428 A1 * | 9/2002 | Tilbor | A63H 17/262 |
| | | | 446/465 |
| 2011/0191013 A1 * | 8/2011 | Leeser | H02K 7/116 |
| | | | 180/10 |
| 2015/0120126 A1 * | 4/2015 | So | G05D 1/104 |
| | | | 701/26 |
| 2015/0353151 A1 * | 12/2015 | Klews | B62J 45/412 |
| | | | 74/5.22 |
| 2018/0181136 A1 * | 6/2018 | Loosararian | B25J 9/1666 |
| 2019/0322328 A1 * | 10/2019 | Ma | B62K 3/002 |
| 2021/0190252 A1 * | 6/2021 | Louis | F16L 55/162 |
| 2023/0373578 A1 * | 11/2023 | Wehlin | F16L 55/00 |
| 2024/0100702 A1 * | 3/2024 | Saunders | G05B 19/41895 |
| 2024/0230014 A1 * | 7/2024 | Jordan | F16L 55/30 |
| 2025/0216015 A1 * | 7/2025 | Motzno | F16L 55/30 |

* cited by examiner

Retracted Position

Deployed Position

*60*

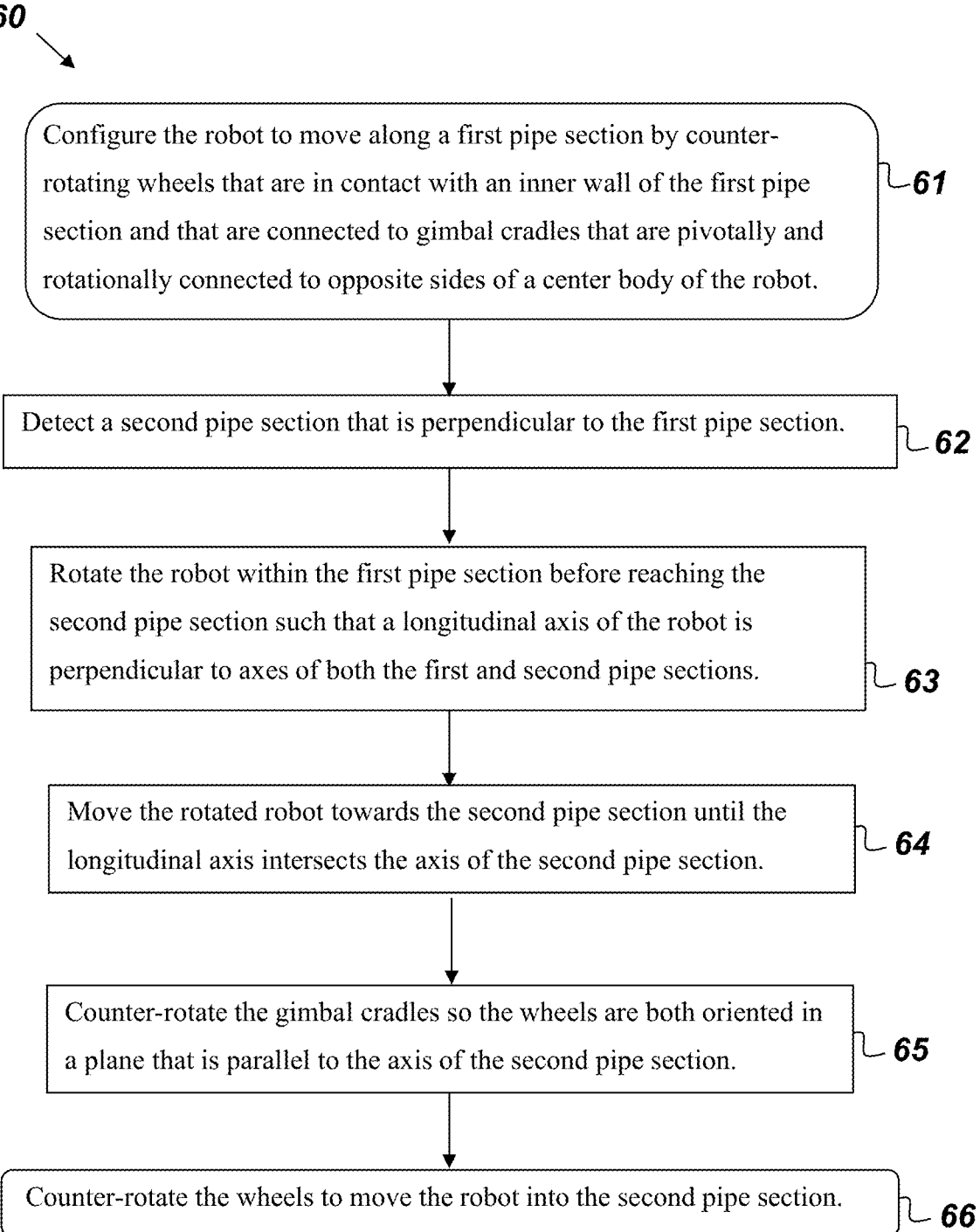

Configure the robot to move along a first pipe section by counter-rotating wheels that are in contact with an inner wall of the first pipe section and that are connected to gimbal cradles that are pivotally and rotationally connected to opposite sides of a center body of the robot. ⌐*61*

Detect a second pipe section that is perpendicular to the first pipe section. ⌐*62*

Rotate the robot within the first pipe section before reaching the second pipe section such that a longitudinal axis of the robot is perpendicular to axes of both the first and second pipe sections. ⌐*63*

Move the rotated robot towards the second pipe section until the longitudinal axis intersects the axis of the second pipe section. ⌐*64*

Counter-rotate the gimbal cradles so the wheels are both oriented in a plane that is parallel to the axis of the second pipe section. ⌐*65*

Counter-rotate the wheels to move the robot into the second pipe section. ⌐*66*

*Fig. 6*

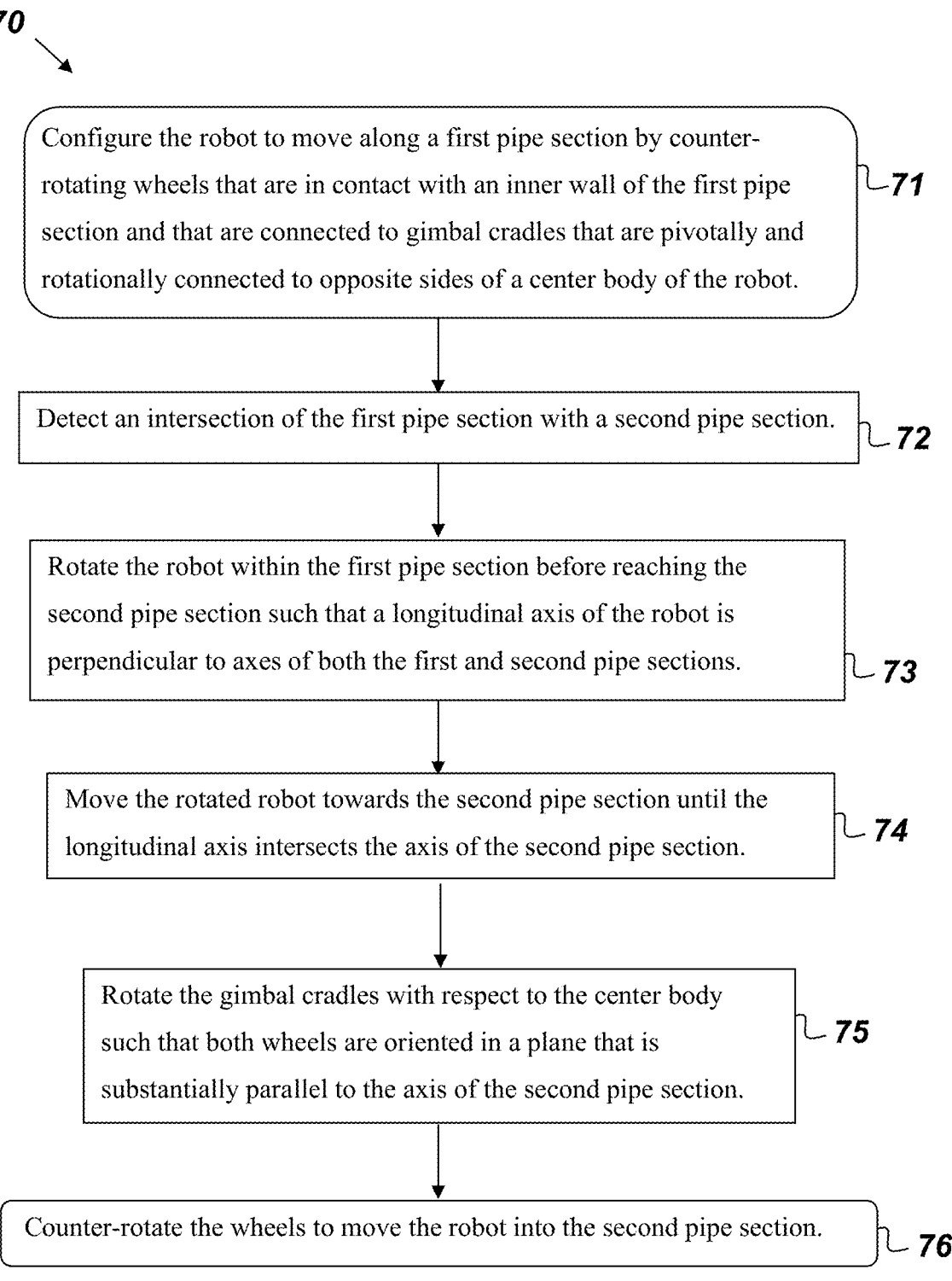

*70*

Configure the robot to move along a first pipe section by counter-rotating wheels that are in contact with an inner wall of the first pipe section and that are connected to gimbal cradles that are pivotally and rotationally connected to opposite sides of a center body of the robot. — *71*

Detect an intersection of the first pipe section with a second pipe section. — *72*

Rotate the robot within the first pipe section before reaching the second pipe section such that a longitudinal axis of the robot is perpendicular to axes of both the first and second pipe sections. — *73*

Move the rotated robot towards the second pipe section until the longitudinal axis intersects the axis of the second pipe section. — *74*

Rotate the gimbal cradles with respect to the center body such that both wheels are oriented in a plane that is substantially parallel to the axis of the second pipe section. — *75*

Counter-rotate the wheels to move the robot into the second pipe section. — *76*

*Fig. 7*

360-DEGREE SENSOR BODY FOR IN-PIPE ROBOT SYSTEM

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; NIWC_Pacific_T2@us.navy.mil. Reference Navy Case Number 211389.

BACKGROUND OF THE INVENTION

This invention relates to the field of robotics-particularly robots capable of navigating within pipes. Over the years, a variety of designs have been proposed for robots capable of navigating within pipes. One key challenge for any such robot is the ability to turn corners. There is a need for an improved robot and method for turning corners within a pipe.

SUMMARY

Disclosed herein is an pipe-crawling robot comprising a center body, a 360-degree sensor array, first and second gimbal cradles, first and second wheel motors mounted respectively to first and second wheels, and a controller. The 360-degree sensor array is mounted to the center body. The first gimbal cradle is rotatably connected to a first side of the center body so as to allow the first gimbal cradle to rotate about a longitudinal axis that passes through the center body. The first wheel motor is pivotally connected to the first gimbal cradle so as to allow the first wheel motor to pivot about a first axis that is substantially perpendicular to the longitudinal axis. The second gimbal cradle is rotatably connected to a second side of the center body that is opposite to the first side so as to allow the second gimbal cradle to rotate about the longitudinal axis. The second wheel motor is pivotally connected to the second gimbal cradle so as to allow the second wheel motor to pivot about a second axis that is perpendicular to the longitudinal axis. The controller is mounted within the center body and communicatively connected to the 360-degree sensor array. The controller is configured to control rotation of the first and second gimbal cradles, the amount of pivot of the first and second wheel motors, and the motor speed and direction of rotation of the first and second wheel motors such that the pipe-crawling robot is capable of crawling through a pipe with only the first and second wheels in contact with an inner wall of the pipe.

Also disclosed herein is a method for turning a corner within a substantially cylindrical pipe with a robot comprising the following steps. The first step provides for configuring the robot to move along a first pipe section by counter-rotating wheels that are in contact with an inner wall of the first pipe section and that are connected to gimbal cradles that are pivotally and rotationally connected to opposite sides of a center body of the robot. Another step provides for detecting a second pipe section that is substantially perpendicular to the first pipe section. Another step provides for rotating the robot within the first pipe section before reaching the second pipe section such that a longitudinal axis of the robot is substantially perpendicular to axes of both the first and second pipe sections. Another step provides for moving the rotated robot towards the second pipe section until the longitudinal axis intersects the axis of the second pipe section. Another step provides for counter-rotating the gimbal cradles such that the wheels are both oriented in a plane that is substantially parallel to the axis of the second pipe section. Another step provides for counter-rotating the wheels to move the robot into the second pipe section.

Also disclosed herein is a method for turning a corner within a substantially cylindrical pipe with a robot comprising the following steps. The first step provides for configuring the robot to move along a first pipe section by counter-rotating wheels that are in contact with an inner wall of the first pipe section and that are connected to gimbal cradles that are pivotally and rotationally connected to opposite sides of a center body of the robot. Another step provides for detecting an intersection of the first pipe section with a second pipe section. Another step provides for rotating the robot within the first pipe section before reaching the second pipe section such that a longitudinal axis of the robot is substantially perpendicular to axes of both the first and second pipe sections. Another step provides for moving the rotated robot towards the second pipe section until the longitudinal axis intersects the axis of the second pipe section. Another step provides for rotating the gimbal cradles with respect to the center body such that the wheels are both oriented in a plane that is substantially parallel to the axis of the second pipe section. Another step provides for counter-rotating the wheels to move the robot into the second pipe section.

BRIEF DESCRIPTION OF THE DRAWINGS

Throughout the several views, like elements are referenced using like references. The elements in the figures are not drawn to scale and some dimensions are exaggerated for clarity.

FIG. 6 is a flowchart.

FIG. 7 is a flowchart.

DETAILED DESCRIPTION OF EMBODIMENTS

The disclosed system and methods below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
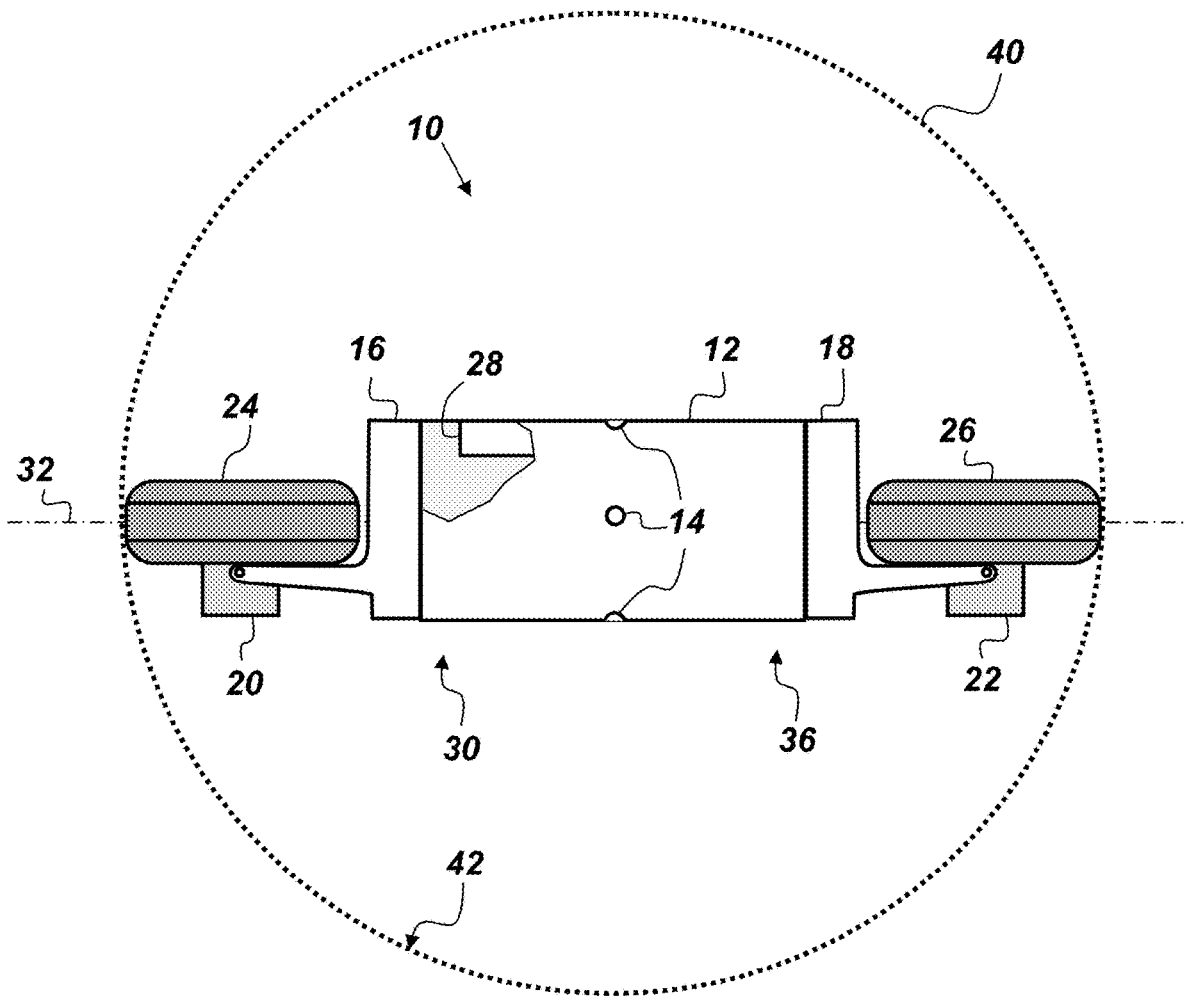
FIG. 1 is a front-view illustration of an embodiment of a pipe-crawling robot.
Figure 2:
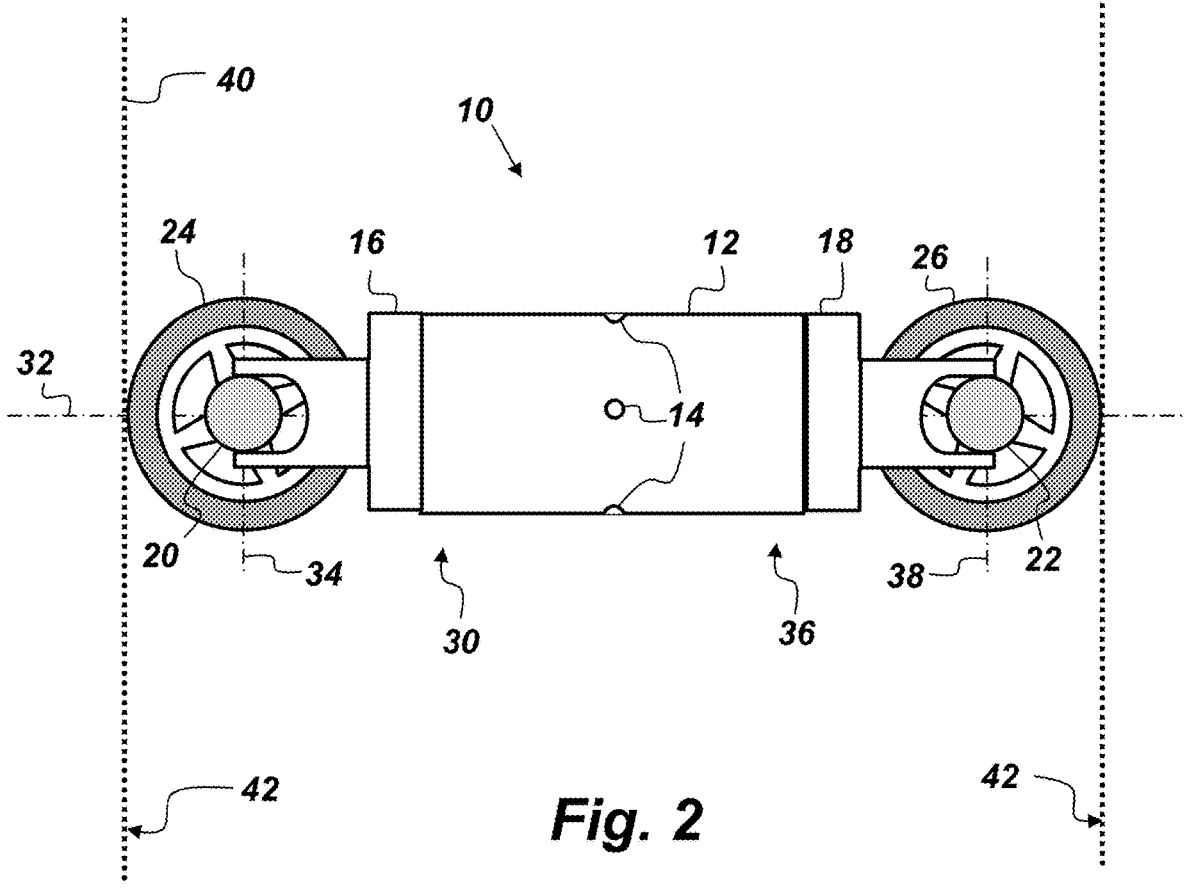
FIG. 2 is a bottom-view illustration of an embodiment of a pipe-crawling robot.

FIGS. 1 and 2 are respectively front- and bottom-views of an embodiment of a pipe-crawling robot 10 (hereinafter referred to as robot 10) that comprises, consists of, or consists essentially of a center body 12, a 360-degree sensor array 14, first and second gimbal cradles 16 and 18, first and second wheel motors 20 and 22, first and second wheels 24 and 26, and a controller 28. The 360-degree sensor array 14 is mounted to the center body 12 so as to allow for sensing in 360 degrees about a longitudinal axis 32. For example, the 360-degree sensor array 14 enables the controller 28 to see in front of, behind, above, and below the robot 10. The robot 10 may be used, for example, to inspect all interior surfaces of the pipe for corrosion. In the depiction of the robot 10 shown in FIG. 1, the wheels 24 and 26 are shown in a deployed position where they are centered on the longitudinal axis 32. It is to be understood that robot 10 is not limited to embodiments where the wheels 24 and 26 are centered on the longitudinal axis 32, such as shown in FIG. 1. In some embodiments of robot 10, the wheels 24 and 26 may be above or below the longitudinal axis 32. The first gimbal cradle 16 is rotatably connected to a first side 30 of the center body 12 so as to allow the first gimbal cradle 16 to rotate about the longitudinal axis 32 that passes through the center body 12. The first wheel motor 20 is pivotally connected to the first gimbal cradle 16 so as to allow the first wheel motor 20 to pivot about a first axis 34 (shown in FIG. 2) that is substantially perpendicular to the longitudinal axis 32. The first wheel motor 20 is connected to the first wheel 24.

The second gimbal cradle 18 is rotatably connected to a second side 36 of the center body 12 that is opposite to the first side 30 so as to allow the second gimbal cradle 18 to rotate about the longitudinal axis 32. The second wheel motor 22, which is connected to the second wheel 26, is pivotally connected to the second gimbal cradle 18 so as to allow the second wheel motor 22 to pivot about a second axis 38 (shown in FIG. 2) that is substantially perpendicular to the longitudinal axis 32. The controller 28 (shown in FIG. 1) is mounted within the center body 12 and is communicatively connected to the 360-degree sensor array 14, the first and second motors 20 and 22, rotary actuators (e.g., motor) used to rotate the gimbal cradles 16 and 18, and to pivot actuators used to pivot the wheel motors. The controller 28 is configured to control: the degree of rotation of the first and second gimbal cradles 16 and 18 with respect to the center body 12; the amount of pivot of the first and second wheel motors 20 and 22 about the first and second axes 34 and 38 respectively; and the motor speed and direction of rotation of the first and second wheel motors 20 and 22 such that the robot 10 is capable of crawling through a substantially cylindrical pipe 40 with only the first and second wheels 24 and 26 in contact with an inner wall 42 of the pipe 40.

The robot 10 is capable of navigating into perpendicular pipe sections by counter-rotating the first and second gimbal cradles 16 and 18, leaving the center body 12 in the same orientation it was in prior to the counter-rotating of the gimbal cradles. This procedure/maneuver is discussed in greater detail below. The robot 10 is also capable of navigating into other pipe sections besides perpendicular pipe sections as described in further detail below. The 360-degree sensor array 14 allows the robot 10 to "drive" in any direction regardless of the rotation of the center body 12 about the longitudinal axis 32 thus eliminating the need for a reaction wheel or momentum wheel to change the center body's orientation when turning corners. The 360-degree sensor array 14 may be any array of sensors capable of sensing the interior of the pipe 40. A suitable example of the 360-degree sensor array 14 includes, but is not limited to, an array comprising four cameras mounted to the center body 12 and spaced 90-degrees apart about the longitudinal axis 32. The 360-degree sensor array 14 may also be used to detect corrosion or other conditions of the pipe 40. Other suitable examples of the 360-degree sensor array 14 include, but are not limited to, an array of radar sensors, two cameras with fish-eye lenses mounted 180-degrees apart from each other, and a plurality of light detection and ranging (lidar) sensors. The controller 28 may be configured to use the 360-degree sensor array 14 to give the robot 10 awareness (localization, mapping, planning etc.) of its pose in the pipe 40. The 360-degree view may concurrently aid in pipe inspection purposes and in simultaneous localization and mapping (SLAM) purposes. The robot 10 has a center of mass that may be offset from the longitudinal axis 32 and located approximately equidistant from the first and second gimbal cradles 16 and 18.

Figure 3A:
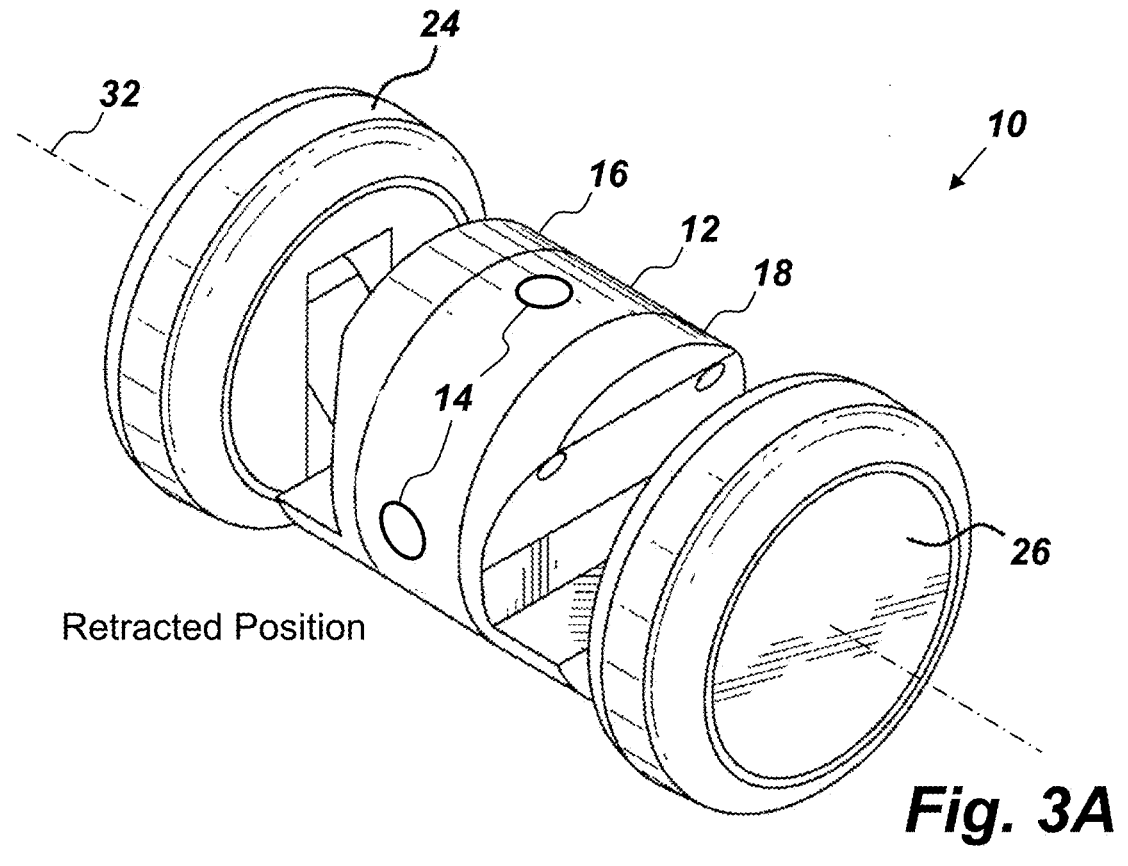
FIG. 3A is a perspective-view illustration of an embodiment of a pipe-crawling robot in a retracted position.
Figure 3B:
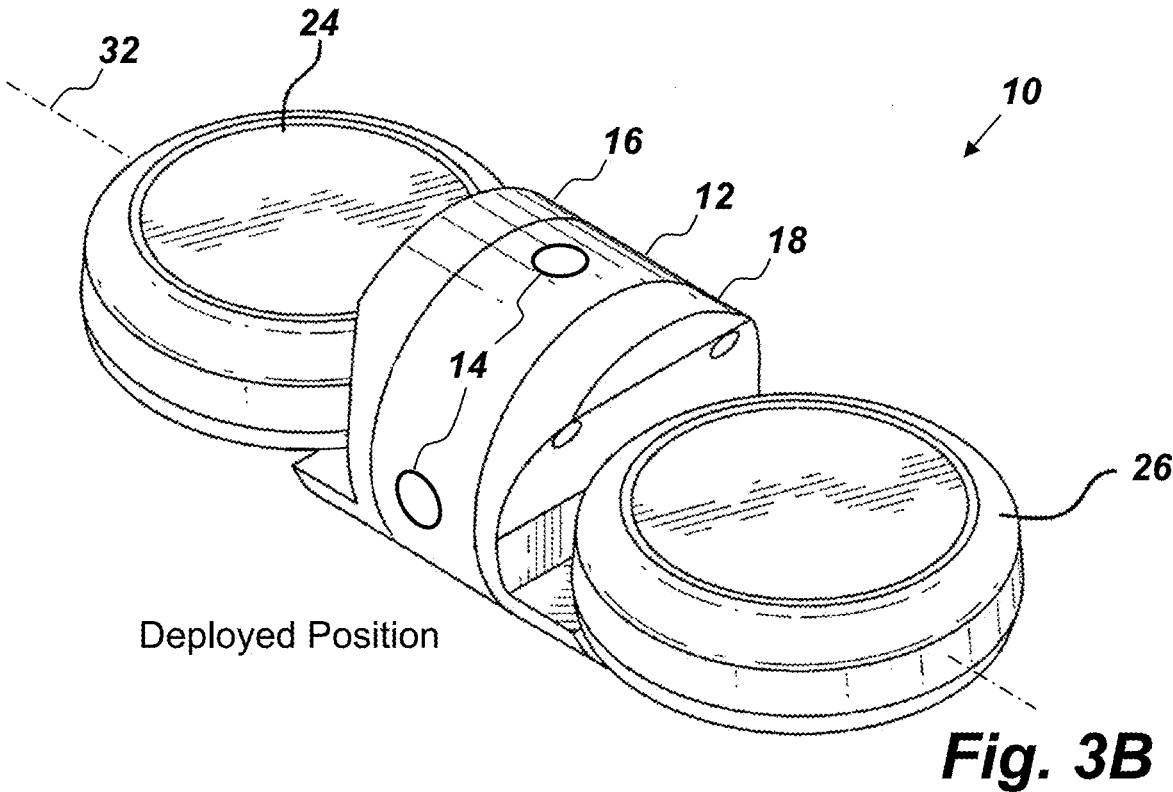
FIG. 3B is a perspective-view illustration of an embodiment of a pipe-crawling robot in a deployed position.

FIGS. 3A and 3B are perspective-view illustrations of an embodiment of the robot 10 in retracted and deployed positions respectively. In FIG. 3A, both wheels 24 and 26 are illustrated in retracted positions where their respective planes in which they rotate are perpendicular to the longitudinal axis 32. The first and second wheel motors 20 and 22 may be configured to respectively pivot at least up to 90-degrees from their retracted positions to their deployed positions. As can be seen in FIG. 3B, when both the first and second wheel motors 20 and 22 are in their respective deployed positions, the first and second wheels 24 and 26 are oriented in approximately the same plane that is substantially parallel to the longitudinal axis 32 in this embodiment. The robot 10 may include a battery pack (not shown) to allow for untethered operations. Alternatively, the robot 10 may be attached to a tether if desirable in a given environment, but the robot 10 is primarily designed to operate autonomously without a tether. The ability of the robot 10 to pivot its wheel motors 20 and 22 to move the wheel motors 24 and 26 between retracted and deployed positions enables the robot 10 to drive up the side walls of the pipe 40 from a resting position at the bottom of the pipe such as is illustrated in FIGS. 2A-2C of US patent application 2021/0190252, which figures are incorporated herein by reference.

In some embodiments, the gimbal cradles 16 and 18 are able to rotate a complete 360-degrees about the longitudinal axis 32. It is desirable that the gimbal cradles 16 and 18 be able to rotate about the longitudinal axis 32 at least 90-degrees, preferably 150-degrees or more to allow for the robot 10 to turn corners by merely counter-rotating the gimbal cradles, such as described in methods 60 and 70 below, without requiring a flywheel or reaction wheel to change the orientation of the center body 12. In most cases, the counter-rotation will cause the torque or moments induced on the center body 12 to cancel out. It is desirable to have some control authority to further rotate either one or both of the gimbal cradles+/−20-degrees to allow for corrective adjustment due to disturbances during the counter-rotation procedure such as wheel slippage, for example.

Figure 4A:
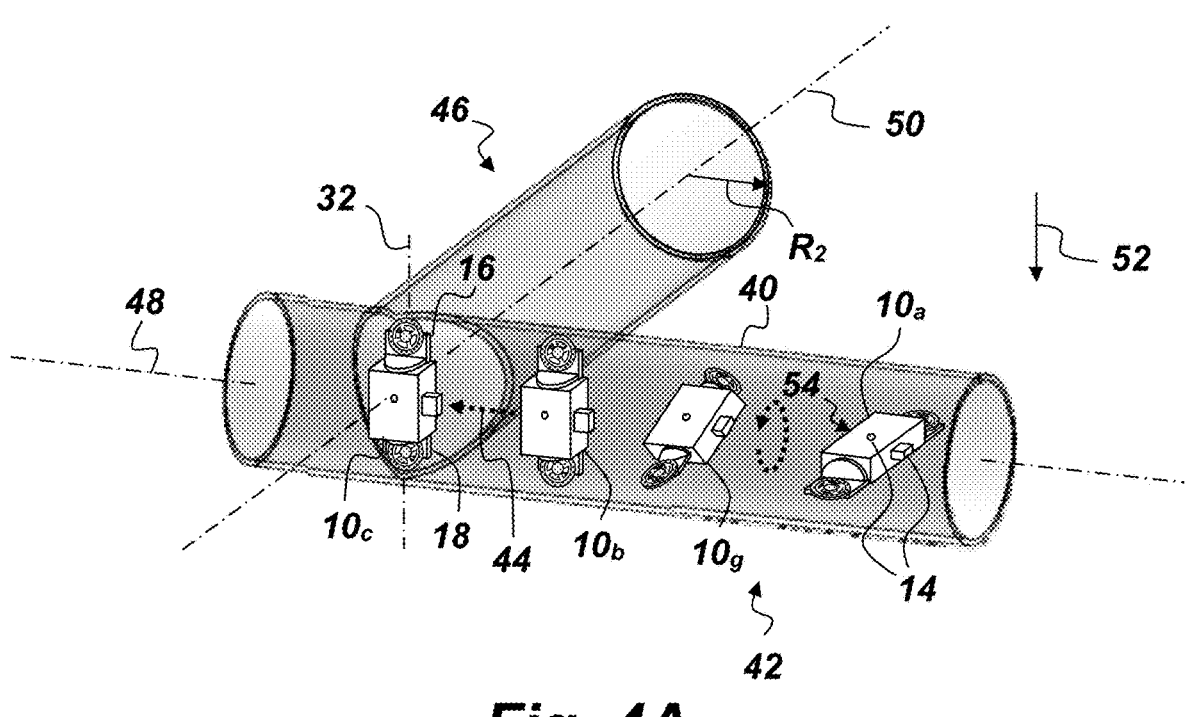
FIGS. 4A and 4B are perspective view illustrations of an embodiment of a pipe-crawling robot in various positions/orientations within a pipe.
Figure 4B:
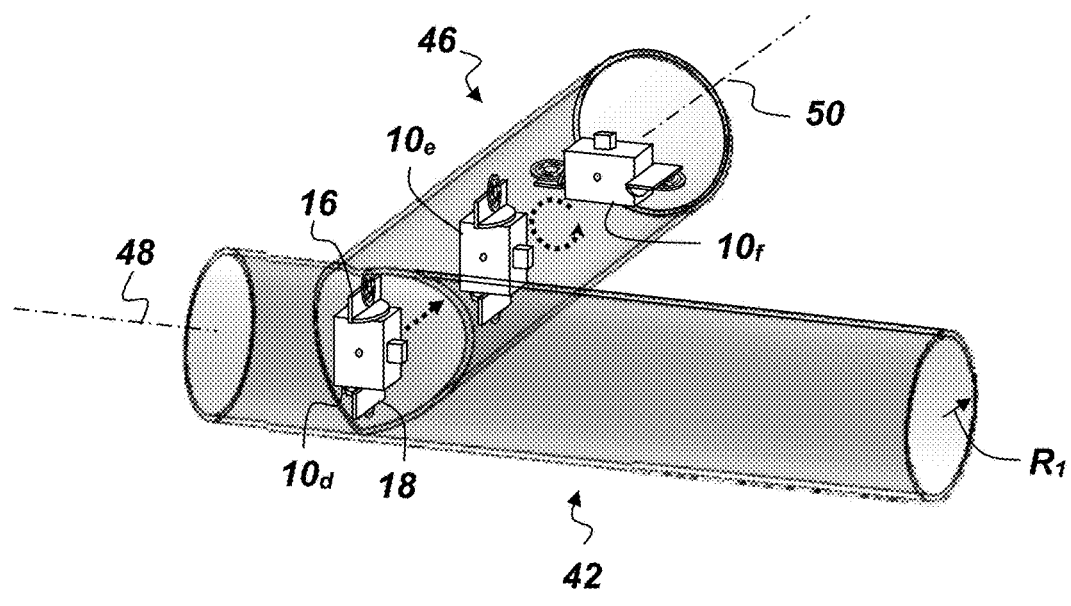
Figure 5A:
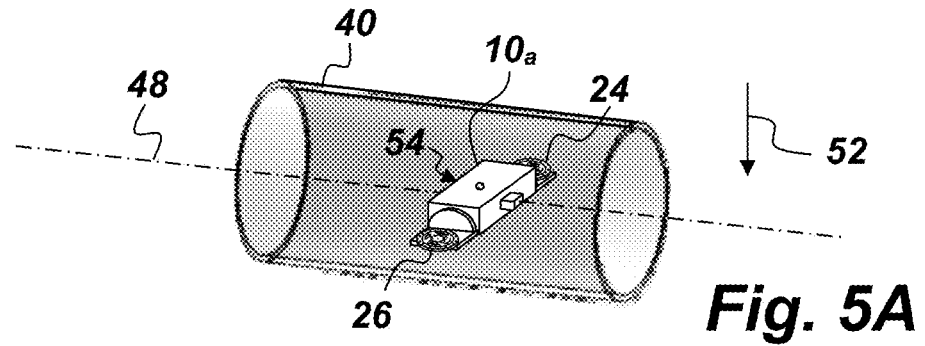
FIGS. 5A, 5B, 5C, and 5D are perspective view illustrations of an embodiment of a pipe-crawling robot in various positions/orientations within a pipe.
Figure 5B:
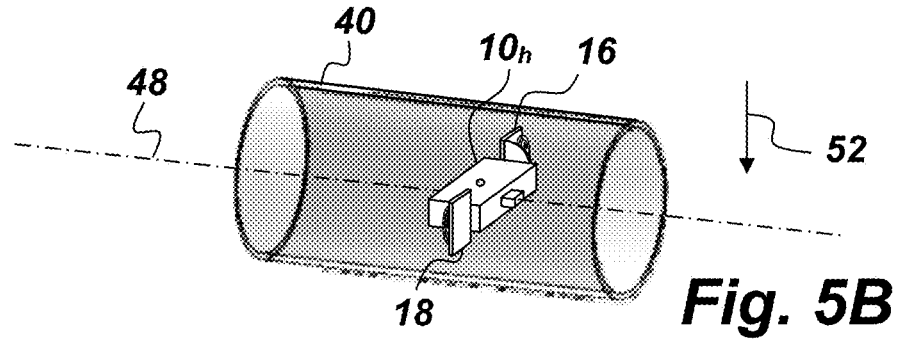
Figure 5C:
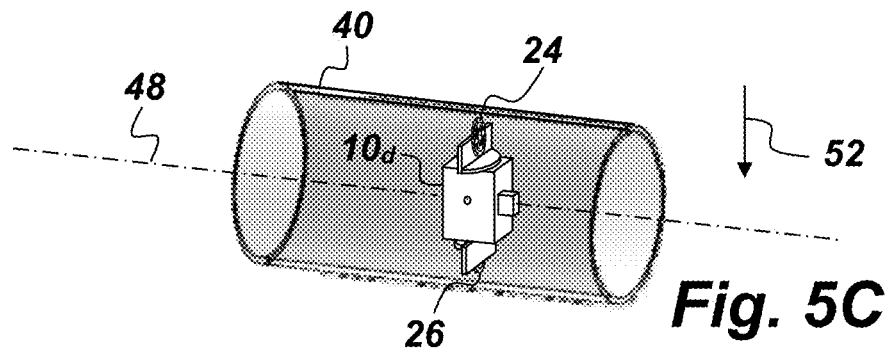
Figure 5D:
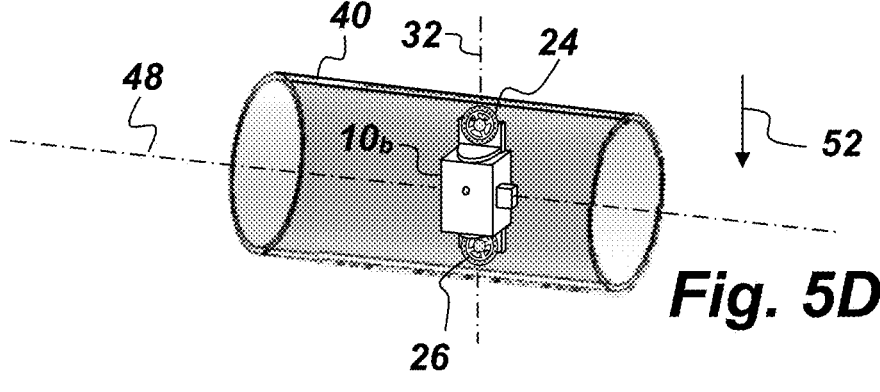

FIGS. 4A and 4B are perspective view illustrations the robot 10 in various positions/orientations within the pipe 40. In FIG. 4A, the robot $10_a$ is shown in a horizontal configuration with its wheel motors in their deployed positions in a first pipe section 42. The robot 10 may move along, or through, the pipe 40 by counter-rotating wheels that are in contact with an inner wall of the pipe 40. For example, with the robot 10 in its deployed position with wheels 24 and 26 in contact with the inner wall of the pipe 40, turning one wheel in a clockwise rotation and the other wheel in a counter-clockwise rotation may result in the robot 10 moving along the pipe 40 in a first direction 44 as shown in FIG. 4A. Conversely, switching the direction of rotation of the two wheels in the example above may result in the robot 10 moving along the pipe 40 in a direction opposite to the first direction 44. The 360-degree sensor array 14 may be used to detect a second pipe section 46 that is perpendicular to the first pipe section 42. In FIGS. 4A and 4B, the first pipe section 42 is shown as having an axis 48 and the second pipe section 46 has an axis 50.

Once a perpendicular pipe is detected such as the second pipe section 46, the robot 10 may be configured to halt forward movement and even move backward until it is separated from an axis of the perpendicular pipe by at least a radius R₂ of the perpendicular pipe such as the position occupied by robot 10$_b$ in FIG. 4A. To navigate from the first pipe section 42 into the second pipe section 46 or to move past the second pipe section 46, the robot 10 may use one or more of gimbal cradle counter-rotation and counter-rotation of the wheels to rotate itself about the axis 48 into a vertical configuration as shown by robot 10$_b$. In this vertical configuration, robot 10$_b$'s longitudinal axis 32 is substantially perpendicular to axes 48 and 50. It is to be understood that the robot 10 is not limited to vertical and horizontal configurations, but they are offered as two of many possible different configurations or poses. The robot 10 may be moved towards the second pipe section 46 while in the vertical configuration until the longitudinal axis 32 substantially intersects the axis 50, as shown by the position of robot 10$_c$.

Robot 10$_d$, shown in FIG. 4B, shows the results of counter-rotating the gimbal cradles 16 and 18 of robot 10$_c$ 90-degrees such that the wheels 24 and 26 are both oriented in a plane that is substantially parallel to axis 50. Robot 10$_e$ shows the robot 10 after it has moved into the second pipe section 46 by counter-rotating the wheels. Note how the center body of the robots 10$_b$ and 10$_e$ have substantially the same pose or orientation after the gimbal-cradle counter-rotation. As desired, the robot 10 may then be rotated back to a horizontal configuration, depicted by robot 10$_f$, for further movement along the second pipe section 46. This manner of turning corners illustrated in FIGS. 4A and 4B may be adapted to navigate the robot 10 upwards or downwards into vertical pipe sections or any other pipe section regardless of its orientation with respect to the gravity vector or angle of intersection with the pipe in which the robot 10 happens to be traveling.

With respect to the embodiment of the robot 10 shown in FIG. 4A, the robot 10 may transition from the horizontal orientation (shown by robot 10$_a$) into the vertical orientation (shown by robot 10$_b$) by counter-rotating the gimbal cradles 16 and 18 a small amount (i.e., 1- to 45-degrees) then counter-rotating the wheels 24 and 26 to make the robot 10 move forward (e.g., in direction 44) thus causing the robot 10 to roll about the first pipe axis 48 (as shown by robot 10$_g$) until the longitudinal axis 32 is parallel to a gravity vector 52. Once the longitudinal axis 32 is parallel to the gravity vector 52, the gimbal cradles may be counter-rotated again to achieve the vertical orientation shown by robot 10$_b$. Note how in FIGS. 4A and 4B, the 360-degree sensor array 14 is depicted as comprising a circular component and square component to allow for easier visualization of the different poses/orientations of the robot 10. Also note how in FIG. 4A, a leading surface 54 of the robot 10 does not change after transitioning from the horizontal orientation to the vertical orientation as discussed above.

FIGS. 5A, 5B, 5C, and 5D show an alternative way to transition the robot 10 from the horizontal position shown by robot 10$_a$ to the vertical position shown by robot 10$_b$. Starting from the horizontal orientation (shown by robot 10$_a$) the gimbal cradles 16 and 18 may be counter-rotated by 90-degrees so both wheels 24 and 26 are in planes perpendicular to the first pipe axis 48, as shown by robot 10$_h$ in FIG. 5B. Then, from the position shown by robot 10$_h$, both wheels 24 and 26 may be rotated in the same direction (i.e., either clockwise or counter-clockwise) causing the robot 10 to roll about the first pipe axis 48 until the longitudinal axis 32 is substantially parallel to the gravity vector 52, as shown by robot 10$_a$ in FIGS. 5C and 4B. When the robot 10 is in the position shown by robot 10$_a$, movement along the pipe 40 is possible by counter-rotating the wheels 24 and 26. Note that when transitioning between the orientations shown by robot 10$_a$, 10$_h$, 10$_d$, and 10$_b$, there is substantially no translational movement of the robot 10 along the first pipe axis 48.

FIG. 6 is a flowchart of a method 60 for turning a 90-degree corner within a pipe, such as pipe 40, with a robot, such as robot 10, comprising the following steps. The first step 61 provides for configuring the robot to move along a first pipe section by counter-rotating wheels that are in contact with an inner wall of the first pipe section and that are connected to gimbal cradles that are pivotally and rotationally connected to opposite sides of a center body of the robot. Another step 62 provides for detecting a second pipe section that is perpendicular to the first pipe section (e.g. a T-joint, an L-joint/elbow, a four-way joint/cross fitting, valve, etc). Another step 63 provides for rotating the robot within the first pipe section before reaching the second pipe section such that a longitudinal axis of the robot is substantially perpendicular to axes of both the first and second pipe sections (such as shown by robot 10$_b$ in FIG. 4A). Another step 64 provides for moving the rotated robot towards the second pipe section until the longitudinal axis substantially intersects the axis of the second pipe section (such as shown by robot 10$_c$ in FIG. 4A). Another step 65 provides for counter-rotating the gimbal cradles such that the wheels are both oriented in a plane that is substantially parallel to the axis of the second pipe section (such as shown by robot 10$_d$ in FIG. 4B). Another step 66 provides for counter-rotating the wheels to move the robot into the second pipe section (such as shown by robot 10$_e$ in FIG. 4B). The step 66 may be performed regardless of the rotational orientation of the center body 10 about the longitudinal axis 32. For example, there is no need for the center body 10 to change orientation as the direction of travel of the robot 10 changes since the 360-degree sensor array allows the controller 28 to see in all directions about the longitudinal axis 32.

Referring back to FIG. 4B, once the robot 10 is in the second pipe section 46, it may be configured to move away from the first pipe section 42 until the longitudinal axis 32 is separated from the axis 48 by at least a radius Ry of the first pipe section 42 (such as shown by robot 10$_e$). Once the robot 10 has moved sufficiently into the second pipe section 46 that the longitudinal axis 32 is separated from the axis 48 by at least the radius R₁, the robot 10 may be rotated about the axis 50 (clockwise or counterclockwise) until the longitudinal axis 32 is substantially perpendicular to the axis 50 and substantially parallel to the axis 48 (such as shown by robot 10$_f$). For example, if the second pipe section 46 is substantially perpendicular to the gravity vector 52, the controller 28 may be configured to rotate the robot 10 within the second pipe section 46 until the longitudinal axis 32 is substantially perpendicular to the gravity vector 52 and the axis 50 once the robot 10 has moved sufficiently into the second pipe section 46 that the longitudinal axis 32 is separated from the axis 48 by at least the radius R₁.

The robot 10 is not limited to making 90-degree turns. In other words, the robot 10 is not limited to navigating into perpendicular pipe sections. The robot 10 may be configured to navigate many different turns. For example, in addition to 90-degree turns, the robot 10 may be configured to navigate through pipe bends up to at least 180-degrees. The robot 10 may also be configured to navigate into a desired section of a pipe intersection (e.g., T-shaped, wye-shaped, double-wye-shaped, pipe manifold, etc.). FIG. 7 is a flowchart of a method 70 for turning a corner within a pipe, such as pipe 40, with a robot, such as robot 10, comprising the following steps. The first step 71, similar to step 61, provides for configuring the robot to move along a first pipe section by counter-rotating wheels that are in contact with an inner wall of the first pipe section and that are connected to gimbal cradles that are pivotally and rotationally connected to opposite sides of a center body of the robot. The next step 72 provides for detecting an intersection of the first pipe section with a second pipe section. Another step 73 provides for rotating the robot within the first pipe section before reaching the second pipe section such that a longitudinal axis of the robot is substantially perpendicular to axes of both the first and second pipe sections. Another step 74 provides for moving the rotated robot towards the second pipe section until the longitudinal axis substantially intersects the axis of the second pipe section. Another step 75 provides for rotating the gimbal cradles with respect to the center body such that the wheels are both oriented in a plane that is substantially parallel to the axis of the second pipe section. Another step 76 provides for counter-rotating the wheels to move the robot into the second pipe section.

To illustrate, in a scenario where it is desirable for the robot 10 to move into a desired pipe section from a given intersection, the controller 28 may be configured to first counter-rotate the gimbal cradles 16 and 18 by an equal amount. This equal counter-rotation typically results in the center body 12 not changing orientation with respect to the pipe in which the robot 10 is situated. Then, if such counter-rotation does not result in both wheels being oriented in a plane that is substantially parallel to the axis of the desired pipe section, then the center body 12 may be used as a reaction force to perform any additional counter-rotation of the gimbal cradles necessary to orient both the wheels in the plane that is substantially parallel to the axis of the desired pipe section. In other words, as the gimbal cradles counter-rotate, the counter-rotation pushes against the center body 12, which may result in rotation of the center body 12 about the longitudinal axis 32. Since the robot 10 is equipped with the 360-degree sensor array 14, the robot 10 is capable of moving into the desired pipe section regardless of the orientation of the center body 12.

From the above description of the pipe-crawling robot and method for turning corners, it is manifest that various techniques may be used for implementing the concepts of the robot 10 and method 60 and 70 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that robot 10 and methods 60 and 70 are not limited to the particular embodiments described herein, but are capable of many embodiments without departing from the scope of the claims.

I claim:

1. A pipe-crawling robot comprising:
   a center body;
   a 360-degree sensor array mounted to the center body;
   a first gimbal cradle rotatably connected to a first side of the center body so as to allow the first gimbal cradle to rotate about a longitudinal axis that passes through the center body;
   a first wheel motor pivotally connected to the first gimbal cradle so as to allow the first wheel motor to pivot about a first axis that is substantially perpendicular to the longitudinal axis, wherein the first wheel motor is connected to a first wheel;
   a second gimbal cradle rotatably connected to a second side of the center body that is opposite to the first side so as to allow the second gimbal cradle to rotate about the longitudinal axis;
   a second wheel motor pivotally connected to the second gimbal cradle so as to allow the second wheel motor to pivot about a second axis that is perpendicular to the longitudinal axis, wherein the second wheel motor is connected to a second wheel;
   a controller mounted within the center body and communicatively connected to the 360-degree sensor array, wherein the controller is configured to control rotation of the first and second gimbal cradles, amount of pivot of the first and second wheel motors, and motor speed and direction of rotation of the first and second wheel motors such that the pipe-crawling robot is capable of crawling through a first pipe with only the first and second wheels in contact with an inner wall of the first pipe; and
   wherein the controller is configured to prepare the pipe-crawling robot to move into an intersecting second pipe by causing the gimbal cradles to counter-rotate such that the first and second wheels are aligned with the second pipe without changing a pose of the center body.

2. The pipe-crawling robot of claim 1, wherein no reaction wheels or momentum wheels are used in the pipe-crawling robot.

3. The pipe-crawling robot of claim 1, wherein the 360-degree sensor array comprises a plurality of cameras mounted on the center body so that the controller has a 360-degree view around the longitudinal axis of the inner wall of the pipe.

4. The pipe-crawling robot of claim 1, wherein the 360-degree sensor array comprises a plurality of LIDAR sensors.

5. The pipe-crawling robot of claim 1, wherein the 360-degree sensor array comprises a plurality of radar sensors.

6. The pipe-crawling robot of claim 1, wherein the robot's center of mass is offset from the longitudinal axis and approximately equidistant from the first and second gimbal cradles.

7. The pipe-crawling robot of claim 6, wherein the first and second wheel motors are configured to pivot up to 90-degrees from a retracted position to a deployed position.

8. The pipe-crawling robot of claim 7, wherein when both the first and second wheel motors are in their respective deployed positions, the first and second wheels are oriented in approximately the same plane.

9. A method for turning a corner within a substantially cylindrical pipe with a robot comprising the following steps:
   configuring the robot to move along a first pipe section by counter-rotating wheels that are in contact with an inner wall of the first pipe section and that are connected to gimbal cradles that are pivotally and rotationally connected to opposite sides of a center body of the robot;

detecting a second pipe section that is perpendicular to the first pipe section;

rotating the robot within the first pipe section before reaching the second pipe section such that a longitudinal axis of the robot is substantially perpendicular to axes of both the first and second pipe sections;

moving the rotated robot towards the second pipe section until the longitudinal axis intersects the axis of the second pipe section;

counter-rotating the gimbal cradles such that the wheels are both oriented in a plane that is substantially parallel to the axis of the second pipe section, and such that the center body maintains a same pose as it had before counter-rotating the gimbal cradles; and counter-rotating the wheels to move the robot into the second pipe section.

10. The method of claim 9, further comprising moving the rotated robot away from the first pipe section until the longitudinal axis is separated from the axis of the first pipe section by at least a radius of the first pipe section.

11. The method of claim 10, further comprising: rotating the rotated robot within the second pipe section once the longitudinal axis is separated from the axis of the first pipe section by at least the radius of the first pipe section until the longitudinal axis is substantially perpendicular to the second pipe section axis and substantially parallel to the first pipe axis.

12. The method of claim 10, further comprising rotating the rotated robot within the second pipe section once the longitudinal axis is separated from the axis of the first pipe section by at least the radius of the first pipe section such that the longitudinal axis is substantially perpendicular to a gravity vector and the second pipe section axis.

13. The method of claim 9, wherein the step of counter-rotating the wheels to move the robot into the second pipe section is performed while the center body maintains the same pose with respect to the longitudinal axis as it had before counter-rotating the gimbal cradles.

14. The method of claim 9, wherein the step of detecting a second pipe section that is perpendicular to the first pipe section is performed by a controller that is mounted within the center body and communicatively connected to a 360-degree sensor array.

15. The method of claim 9, wherein the second pipe section is connected to the first pipe section via a T-joint.

16. The method of claim 9, wherein the second pipe section is connected to the first pipe section via an L-joint.

17. The method of claim 9, wherein the step of counter-rotating the gimbal cradles further comprises counter-rotating each of the gimbal cradles the same amount and then using the center body as a reaction force to perform any additional rotation of the gimbal cradles necessary to orient both the wheels in the plane that is substantially parallel to the axis of the second pipe section.

18. The method of claim 9, further comprising, after detecting the second pipe section, backing the pipe-crawling robot away from the second pipe section such that there is sufficient room in the first pipe section to rotate the center body until the longitudinal axis of the robot is substantially perpendicular to the first and second pipe section axes.

19. A method for turning a corner within a substantially cylindrical pipe with a robot comprising the following steps:

configuring the robot to move along a first pipe section by counter-rotating wheels that are in contact with an inner wall of the first pipe section and that are connected to gimbal cradles that are pivotally and rotationally connected to opposite sides of a center body of the robot;

detecting an intersection of the first pipe section with a second pipe section;

rotating the robot within the first pipe section before reaching the second pipe section such that a longitudinal axis of the robot is substantially perpendicular to axes of both the first and second pipe sections;

moving the rotated robot towards the second pipe section until the longitudinal axis intersects the axis of the second pipe section;

counter-rotating the gimbal cradles with respect to the center body such that the wheels are both oriented in a plane that is substantially parallel to the axis of the second pipe section and such that an orientation of the center body does not substantially change; and counter-rotating the wheels to move the robot into the second pipe section.

\* \* \* \* \*